Jan. 9, 1934.　　　　　R. GUNN　　　　　1,942,421
APPARATUS FOR MEASURING ALTITUDE
Filed Feb. 15, 1932　　　2 Sheets-Sheet 1
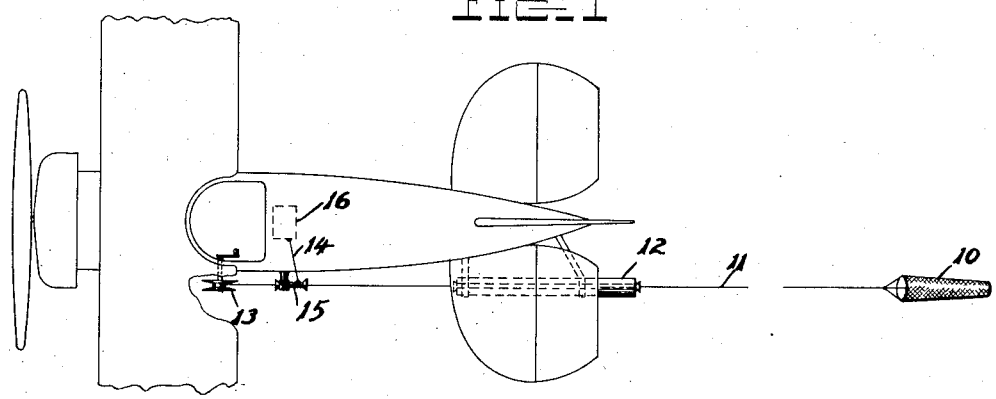
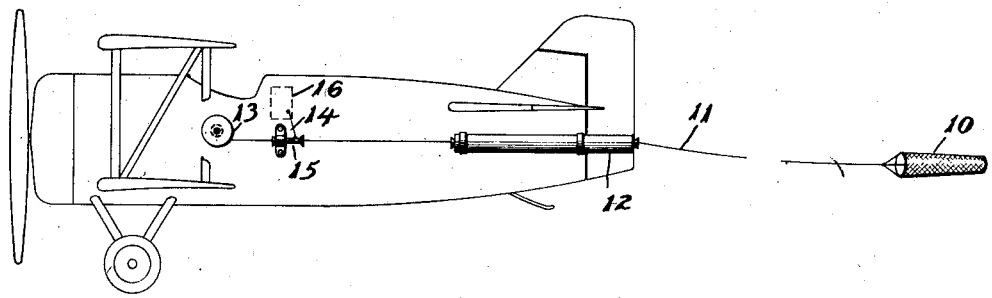
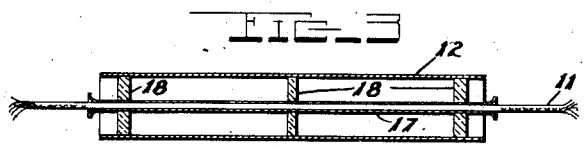
INVENTOR
Ross Gunn
BY
ATTORNEY Jan. 9, 1934.   R. GUNN   1,942,421
APPARATUS FOR MEASURING ALTITUDE
Filed Feb. 15, 1932   2 Sheets-Sheet 2
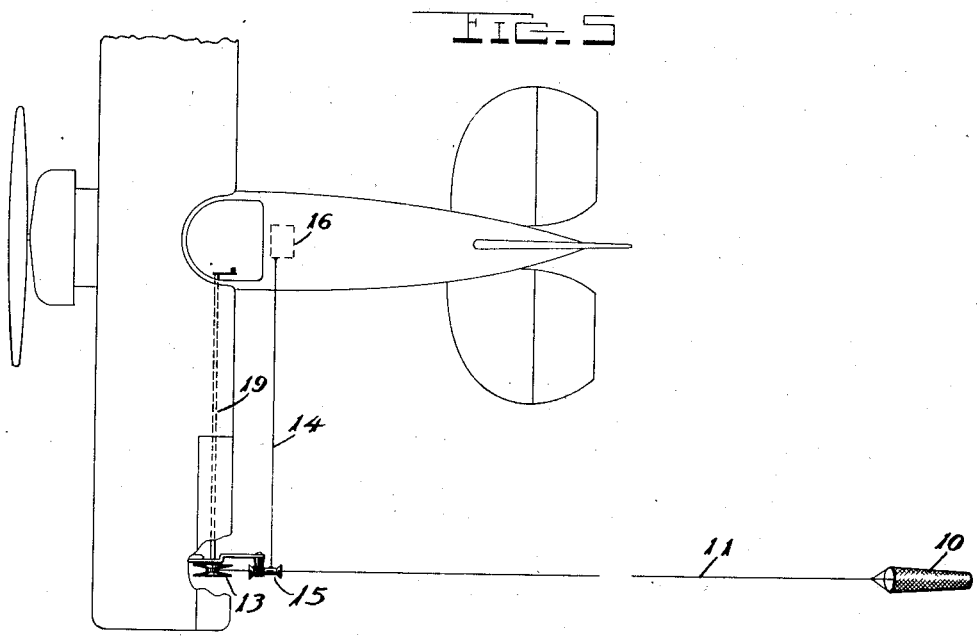
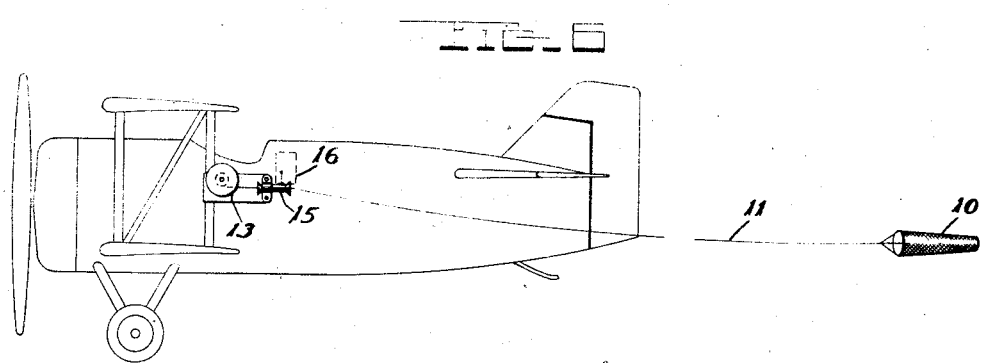
INVENTOR
Ross Gunn
BY
ATTORNEY Patented Jan. 9, 1934

1,942,421

UNITED STATES PATENT OFFICE 1,942,421

APPARATUS FOR MEASURING ALTITUDE

Ross Gunn, Washington, D. C.

Application February 15, 1932. Serial No. 593,084

4 Claims. (Cl. 177—352)

(Granted under the act of March 3, 1883, as amended April 30, 1928; 370 O. G. 757)

This invention relates to altitude apparatus, and more particularly to apparatus for measuring the altitude of aircraft.

Aircraft altitude instruments of the capacity type, measure the capacity between the earth as one side of the condenser and the airplane and a wire trailed astern of the plane as the other side. When fixed wires are attached to the plane, the only changes in the observed capacity will be due to variations in the altitude of the airplane and the instrument's scale can be graduated accordingly. In the prior practice, a wire has been trailed from the fuselage or wing tip with a weight or fish attached to its end. Such a wire swings or flops about and the capacity between it and the metal framework of the airplane varies considerably without changes in the altitude of the plane. Obviously, such variations involve difficulties in taking observations, lead to inaccuracies and are undesirable.

An object of this invention is to eliminate the changes in capacity within the capacity system of an airplane due to the motions of the aircraft.

With this and other objects in view, the invention consists of a construction and arrangement of parts as will be described more fully hereinafter in connection with the accompanying drawings, in which:

Figs. 1 and 2 show an airplane having a trailing wire provided with an aerodynamic drag and, also, provided with a shield over that portion adjacent the rudder and elevator;

Fig. 3 is a longitudinal cross-section of the shield located near the control surfaces;

Fig. 4 is an end view of the shield;

Figs. 5 and 6 show an airplane having a wire trailing from one wing tip and provided with an aerodynamic drag.

The aerodynamic drag 10 keeps the wire 11 taut and maintains it in a substantially horizontal position astern of the airplane when in horizontal flight. Metal shield 12 prevents any net changes in capacity resulting from the movements of the rudder and elevator. Wire 11 is reeled in and payed out by means of reel 13. Conductor 14 connects metal guide 15 with the altitude instrument 16, the instrument and associated leads being shielded from local capacity changes.

The shield comprises a metal tube 17 through which the wire 11 is reeved. The metal tube 17 is supported at the center of metal shield 12 by insulation disks 18. This shield, when mounted as shown in Figs. 1 and 2, protects wire 11, which is the sensitive element, from the effects of local motions of the rudder and elevator control surfaces.

The aerodynamic drag may be of any size or shape which will offer the desired resistance to being dragged through the air.

The installation described makes the capacity altimeter very satisfactory for ordinary use.

Another arrangement which may be used is shown in Figs. 5 and 6, in which the wire with aerodynamic drag is used, but instead of shielding the wire from the motions of the control surfaces, the reel and wire are attached to a support near the wing tip. The wire being well removed from the rudder and elevator, it is practically unaffected by their motions. The reel may be operated by a long shaft 19, as shown, or the wire can be led through pulleys to a reel located near the cockpit.

It will be understood that the above description and accompanying drawings comprehend only the general and preferred embodiment of my invention, and that minor changes in the details of the construction and arrangemet of parts may be made within the scope of the appended claims without sacrificing any of the advantages of this invention.

The invention described herein may be manufactured and used by or for the Government of the United States of America for governmental purposes without the payment of any royalties thereon.

I claim:

1. An aircraft altitude measuring device of the capacity type, comprising a wire acting as a sensitive capacity element, an aerodynamic drag attached to the end of said wire for maintaining it taut and in a substantially horizontal position, and means associated with said wire for shielding it electrically from the effects of the local motions of the rudder and elevator control surfaces.

2. An aircraft altitude measuring system of the capacity type, comprising a wire acting as a sensitive capacity element, means associated with the end of said wire for maintaining it taut and in a substantially horizontal position, means associated with said wire for shielding it electrically from the effects of the local motions of the rudder and elevator control surfaces, and means for reeling in and out said wire.

3. An aircraft altitude measuring device of the capacity type, comprising a wire parallel to and exteriorly located with regard to the fuselage of said aircraft acting as a sensitive capacity element; an aerodynamic drag attached to the end of said wire for maintaining it taut and in a substantially fixed relationship to the body of the aircraft, and a concentric double walled metallic shield fixedly surrounding said wire at a point adjacent the movable rudder and elevating control surfaces of said aircraft whereby the capacity system represented by the said aircraft and said wire is maintained at a constant value.

4. In an aircraft altitude measuring system of the capacity type, a capacity stabilizer consisting of two concentric metallic hollow cylinders fixedly separated by a plurality of spaced concentric insulating disks, the inner cylinder of which is furnished with flared ends and the outer cylinder is adapted to being fixedly secured by brackets to the fuselage of an aircraft adjacent the movable rudder and elevator control surfaces of said aircraft whereby the capacitance of a sensitive capacity element threaded through the inner cylinder of said stabilizer is unaffected by the said movable control surfaces.

ROSS GUNN.